United States Patent
Matsuda et al.

(10) Patent No.: US 11,592,045 B2
(45) Date of Patent: Feb. 28, 2023

(54) LAP FILLET ARC WELDED JOINT

(71) Applicant: NIPPON STEEL CORPORATION, Tokyo (JP)

(72) Inventors: Kazuki Matsuda, Tokyo (JP); Shinji Kodama, Tokyo (JP); Kotaro Watanabe, Tokyo (JP); Masatoshi Tokunaga, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 467 days.

(21) Appl. No.: 16/636,788

(22) PCT Filed: Aug. 20, 2018

(86) PCT No.: PCT/JP2018/030694
§ 371 (c)(1),
(2) Date: Feb. 5, 2020

(87) PCT Pub. No.: WO2019/035490
PCT Pub. Date: Feb. 21, 2019

(65) Prior Publication Data
US 2020/0378420 A1    Dec. 3, 2020

(30) Foreign Application Priority Data

Aug. 18, 2017 (JP) .............................. JP2017-157961

(51) Int. Cl.
*F16B 5/08* (2006.01)
(52) U.S. Cl.
CPC ..................................... *F16B 5/08* (2013.01)
(58) Field of Classification Search
CPC ......... F16B 5/08; B23K 9/02; B23K 2101/18; B23K 2101/185; B23K 2103/04; B23K 2103/05
See application file for complete search history.

(56) References Cited

U.S. PATENT DOCUMENTS

2019/0388995 A1    12/2019 Kodama et al.

FOREIGN PATENT DOCUMENTS

| JP | 11-61275 A | 3/1999 |
| JP | 2002-361481 A | 12/2002 |

(Continued)

OTHER PUBLICATIONS

JP 2008178910 English Machine Translation (Year: 2008).*

(Continued)

*Primary Examiner* — Christopher M Koehler
(74) *Attorney, Agent, or Firm* — Birch, Stewart, Kolasch & Birch, LLP

(57) ABSTRACT

A lap fillet arc welded joint includes: a first steel sheet and a second steel sheet which are overlapped each other, the first steel sheet and the second steel sheet each having a tensile strength of 950 MPa or more; and a weld metal which extends along a corner formed by an upper surface of the first steel sheet and an end surface of the second steel sheet. When: a toe angle of the weld metal is defined as β; the total number of concave portions present on the surface of the weld metal included a range of 0.4 mm or less from a fusion boundary is defined as NA; and the number of concave portions in contact with ferrite grains having a maximum grain size of 10 μm or more is defined as NB, the weld metal satisfies the following conditional expressions (1) and (2) at the same time.

$0° < β < 30°$  (1)

$NB/NA ≤ 0.70$  (2)

(Here, NA is 20 or more).

2 Claims, 8 Drawing Sheets

(56) References Cited

FOREIGN PATENT DOCUMENTS

| | | |
|---|---|---|
| JP | 2008-178910 A | 8/2008 |
| JP | 2013-220431 A | 10/2013 |
| JP | 2013-226600 A | 11/2013 |
| JP | 2017-101299 A | 6/2017 |

OTHER PUBLICATIONS

General Rules for Fatigue Testing of Metals, JIS Z2273, 1978, total 26 pages.
"Method of Plane Bending Fatigue Testing of Metal Plates", JIS Z2275, 1978, total 20 pages.
International Search Report for PCT/JP2018/030694 dated Oct. 30, 2018.
Written Opinion of the International Searching Authority for PCT/JP2018/030694 (PCT/ISA/237) dated Oct. 30, 2018.

* cited by examiner

LAP FILLET ARC WELDED JOINT

TECHNICAL FIELD OF THE INVENTION

The present invention relates to a lap fillet arc welded joint.

Priority is claimed on Japanese Patent Application No. 2017-157961, filed Aug. 18, 2017, the content of which is incorporated herein by reference.

RELATED ART

In an automotive field, for environmental conservation, improvement of mileage by reducing the weight of a vehicle body, and improvement of collision safety are required. Conventionally, various technological developments, such as using a thin high strength steel sheet as a structural member of the vehicle body and optimizing a vehicle body structure, are carried out in order to reduce the weight of the vehicle body and to improve the collision safety. A welded joint having the high strength steel sheets as base materials is included in automotive structural members. In the automotive field, a lap fillet arc welding method which carries out a fillet arc welding in a state that two high strength steel sheets are overlapped each other is generally used as a method for manufacturing the welded joint. In the present specification, the welded joint manufactured by the lap fillet arc welding method is referred to as a lap fillet arc welded joint.

Structural members used in environments with vibrations and repeated external loads, such as the automotive structural members, are required to have not only normal static tensile strength but also sufficient fatigue strength in order to withstand forces repeatedly acting. The fatigue strength (fatigue limit) of the steel sheet increases in proportion to its tensile strength. However, it is generally known that the fatigue strength of the lap fillet arc welded joint is lower than the fatigue strength of the steel sheet which is a base material of this joint.

One of the causes for the above is that the fatigue strength of the lap fillet arc welded joint has dependency on the shape of a weld toe portion. FIG. 12 is a graph showing the relationship between the fatigue strength (fatigue limit) of the lap fillet arc welded joint and the tensile strength of the base steel sheet, with the shape of the weld toe portion as a parameter. Hereinafter, the relationship between fatigue strength and tensile strength is referred to as a fatigue characteristic. In FIG. 12, the fatigue characteristic of the base steel sheet alone is also shown as a reference (see straight line C0). As shown by the straight line C0, the fatigue strength of the base steel sheet alone increases in proportion to its tensile strength.

In FIG. 12, a curve C1 indicates a fatigue characteristic when the shape of a toe portion of a weld metal is steep, and a curve C2 indicates a fatigue characteristic when the shape of the toe portion of the weld metal is gentle. As shown by the curve C1, when the shape of the toe portion of the weld metal is steep, even if the tensile strength of the base steel sheet increases, the fatigue strength of the lap fillet arc welded joint hardly increases and only changes at a very low level compared with the fatigue strength of the base steel sheet alone.

The reason for the above is because stress concentration at the toe portion becomes very high when the shape of the toe portion of the weld metal is steep. As a result, as shown in FIG. 13, when the lap fillet arc welded joint continues to receive repeated tensile loads, a fatigue crack 300 occurs at the fusion boundary, which is a boundary between a toe portion of a weld metal 100 and a base steel sheet (lower sheet) 200, at an early stage. FIG. 13 is a schematic view of a joint portion between the weld metal 100 having a steep toe shape and the base steel sheet 200 as seen in a cross section orthogonal to a weld line of the weld metal 100.

On the other hand, as shown by the curve C2 of FIG. 12, when the shape of the toe portion of the weld metal is gentle, the fatigue strength of the lap fillet arc welded joint is lower than that of the base steel sheet alone but increases as the tensile strength of the base steel sheet increases. The reason for the above is because it is possible to suppress stresses from concentrating at the toe portion when the shape of the toe portion of the weld metal is gentle (see FIG. 14). Therefore, conventionally, a technique for controlling the shape of the toe portion of the weld metal into a gentle shape is generally used as a technique for improving the fatigue strength of the lap fillet arc welded joint.

For example, in Patent Document 1, as a technique for stably controlling the shape of the toe portion of the weld metal into a gentle shape, a technique for improving wettability of molten metal with respect to a base steel sheet by performing a lap fillet arc welding using a welding material (welding wire) having a specific component composition. The welding material disclosed in Patent Document 1 contains, by mass %, C: 0.005% to 0.40%, Mn: 0.2% to 8.0%, and Si: more than 1.1% to 8.0%, and further contains Se: 0.01% to 1% and/or Te: 0.01% to 1%.

In Patent Document 2, a technique is disclosed in which concentration of local stresses and strains due to the difference in hardness occurred near the fusion boundary is reduced by not only controlling the shape of the toe portion of the weld metal into a gentle shape but also controlling the ratio of hardness of the weld metal with respect to hardness of the heat-affected zone within a specific range, in order to improve the fatigue strength of the lap fillet arc welded joint.

The hardness of the weld metal is the hardness Hv (FL−0.5) of the weld metal at a position 0.5 mm away from the fusion boundary FL of the weld toe portion toward the weld metal. The hardness of the heat-affected zone is the hardness Hv (FL+0.5) of the heat-affected zone at a position 0.5 mm away from the fusion boundary FL toward the heat-affected zone. Specifically, in the technique of Patent Document 2, the ratio (Hv (FL−0.5)/(FL+0.5)) of hardness of the weld metal with respect to hardness of the heat-affected zone is controlled within the range of 0.3 to 0.9.

PRIOR ART DOCUMENT

[Patent Document]
[Patent Document 1] Japanese Unexamined Patent Application, First Publication No. 2002-361481
[Patent Document 2] Japanese Unexamined Patent Application, First Publication No. 2008-178910

DISCLOSURE OF THE INVENTION

Problems to be Solved by the Invention

As described above, conventionally, a technique for controlling the shape of the toe portion of the weld metal into a gentle shape is generally used as a technique for improving the fatigue strength of the lap fillet arc welded joint. However, as shown by the curve C2 of FIG. 12, it has been found by researches of the present inventors that when the tensile strength of the base steel sheet is 950 MPa or more, the fatigue strength of the lap fillet arc welded joint is significantly reduced even if the shape of the toe portion of the weld metal is controlled into a gentle shape.

Recently, it is strongly required to reduce the weight of the automobile and to improve the collision safety. Therefore, establishing joint technology (welding technology), that can achieve various conditions such as fatigue strength in order to use high-strength thin steel sheet with high tensile strength of 950 MPa or more as an automotive structural member, is a very important research theme. Firstly, the present inventors have investigated reasons why the fatigue strength of the lap fillet arc welded joint is significantly reduced when the tensile strength of the base steel sheet is 950 MPa or more.

As a result, as shown in FIG. 14, it has been found that when the tensile strength of the base steel sheet is 950 MPa or more, a fatigue crack 310 occurs not on the fusion boundary between a weld metal 110 having a gentle toe shape and the base steel sheet (lower sheet) 200 but on the surface of the toe portion of the weld metal. FIG. 14 is a schematic view of a joint portion between the weld metal 110 having the gentle toe shape and the base steel sheet 200 as seen in a cross section orthogonal to a weld line of the weld metal 110.

Furthermore, when the present inventors have microscopically observed the portion where the fatigue crack 310 has occurred, it has been found that the fatigue crack 310 has occurred from coarse ferrite grains present on the surface of the toe portion of the weld metal. Based on the above results, the present inventors have considered as follows the reason why the fatigue strength of the lap fillet arc welded joint is significantly reduced when the tensile strength of the base steel sheet is 950 MPa or more.

When the tensile strength of the base steel sheet is 950 MPa or more, a composite structure of ferrite and bainite (or martensite) is generated on the surface of the weld metal. As is generally known, ferrite has a relatively soft structure, and bainite (or martensite) has a relatively hard structure. Therefore, it is considered that stress and strain tend to concentrate on soft ferrite due to the difference in strength between structures having different hardnesses. Additionally, in an environment where the lap fillet arc welded joint is repeatedly subjected to tensile loads, stress and strain concentrate on the ferrite, and as a result, it is considered that the fatigue crack 310 occurs from ferrite grains present on the surface of the weld metal at an early stage.

For such the above technical problem, even when the tensile strength of the base steel sheet is 950 MPa or more, the lap fillet arc welded joint having high fatigue strength can be obtained by simply performing the lap fillet arc welding using a welding wire having higher strength. In FIG. 12, a curve C3 indicates a fatigue characteristic of the lap fillet arc welded joint obtained by performing the lap fillet arc welding using a welding wire having higher strength so that the shape of the toe portion of the weld metal becomes gentle. As shown by the curve C3, simply, if a higher strength welding wire is used, the fatigue strength of the lap fillet arc welded joint continues to increase even if the tensile strength of the base steel sheet is 950 MPa or more.

However, as a result of further research by the present inventors, it has been found that when the lap fillet arc welding is performed using a higher strength welding wire, hydrogen embrittlement cracks tend to occur in the weld metal due to the increased strength (hardness) of the weld metal. In other words, even when the tensile strength of the base steel sheet is 950 MPa or more, it is possible to increase the fatigue strength of the lap fillet arc welded joint using a higher strength welding wire, however, it has been found that the total strength of the lap fillet arc welded joint is rather lowered when considering occurrence of the hydrogen embrittlement cracks. In addition, the use of a higher strength welding wire leads to an increase in the manufacturing cost of the lap fillet arc welded joint.

On the other hand, a method of increasing the fatigue strength of the lap fillet arc welded joint by applying the technique disclosed in Patent Document 2 without using a high-strength welding wire is also conceivable. However, as described above, when the tensile strength of the base steel sheet is 950 MPa or more, it is conceivable that stress and strain tend to concentrate on soft ferrite due to the difference in strength between different hardness structures present on the surface of the weld metal as the reason why the fatigue strength of the lap fillet arc welded joint is reduced. Therefore, as the technique disclosed in Patent Document 2, even if applying a method of controlling the ratio of hardness of the weld metal with respect to hardness of the heat-affected zone within a specific range in order to reduce the concentration of local stresses and strains due to the difference in hardness (that is, the difference in hardness between the heat-affected zone and the weld metal) occurred near the fusion boundary, it is difficult to increase the fatigue strength of the lap fillet arc welded joint manufactured by base steel sheets each having the tensile strength of 950 MPa or more.

The present invention is made in consideration of the above-described circumstances, and an object thereof is to increase the fatigue strength of a lap fillet arc welded joint manufactured by base steel sheets each having a tensile strength of 950 MPa or more without using a high-strength welding wire that causes the hydrogen embrittlement cracks.

Means for Solving the Problem

In order to achieve the above-described object, the present invention employs the followings.

(1) A lap fillet arc welded joint according to an aspect of the present invention includes: a first steel sheet and a second steel sheet which are overlapped each other, the first steel sheet and the second steel sheet each having a tensile strength of 950 MPa or more; and a weld metal which extends along a corner formed by an upper surface of the first steel sheet and an end surface of the second steel sheet. In the lap fillet arc welded joint, a Vickers hardness of the weld metal is 400 HV or less. In a case where a cross section orthogonal to a weld line of the weld metal is viewed, when: a position of a fusion boundary present on the upper surface of the first steel sheet is defined as a point A; a position 0.5 mm away from the point A toward the weld metal in a X direction parallel to the upper surface of the first steel sheet is defined as a point D; a position 0.4 mm away from the point A toward the weld metal in the X direction is defined as a point C; an intersection point between a surface of the weld metal and a straight line which passes through the point D and extends in a thickness direction of the first steel sheet is defined as a point B; an angle between a straight line connecting the point A with the point B and a straight line connecting the point A with the point D is defined as a toe angle β of the weld metal; the total number of concave portions present on the surface of the weld metal included within a range between the point A and the point C is defined as NA; and the number of concave portions in contact with ferrite grains having a maximum grain size of 10 μm or more is defined as NB, the weld metal satisfies the following conditional expressions (1) and (2) at the same time.

$$0° < \beta < 30° \tag{1}$$

$$NB/NA \leq 0.70 \tag{2}$$

(Here, NA is 20 or more.)

(2) In the lap fillet arc welded joint as described above (1), each of the first steel sheet and the second steel sheet may have a thickness of 0.8 mm to 3.5 mm.

Effects of the Invention

According to the above aspect of the present invention, it is possible to increase the fatigue strength of a lap fillet arc welded joint manufactured by base steel sheets each having a tensile strength of 950 MPa or more without using a high-strength welding wire that causes hydrogen embrittlement cracks.

EMBODIMENTS OF THE INVENTION

Hereinafter, a lap fillet arc welded joint according to an embodiment of the present invention will be described with reference to the drawings.

Figure 1:
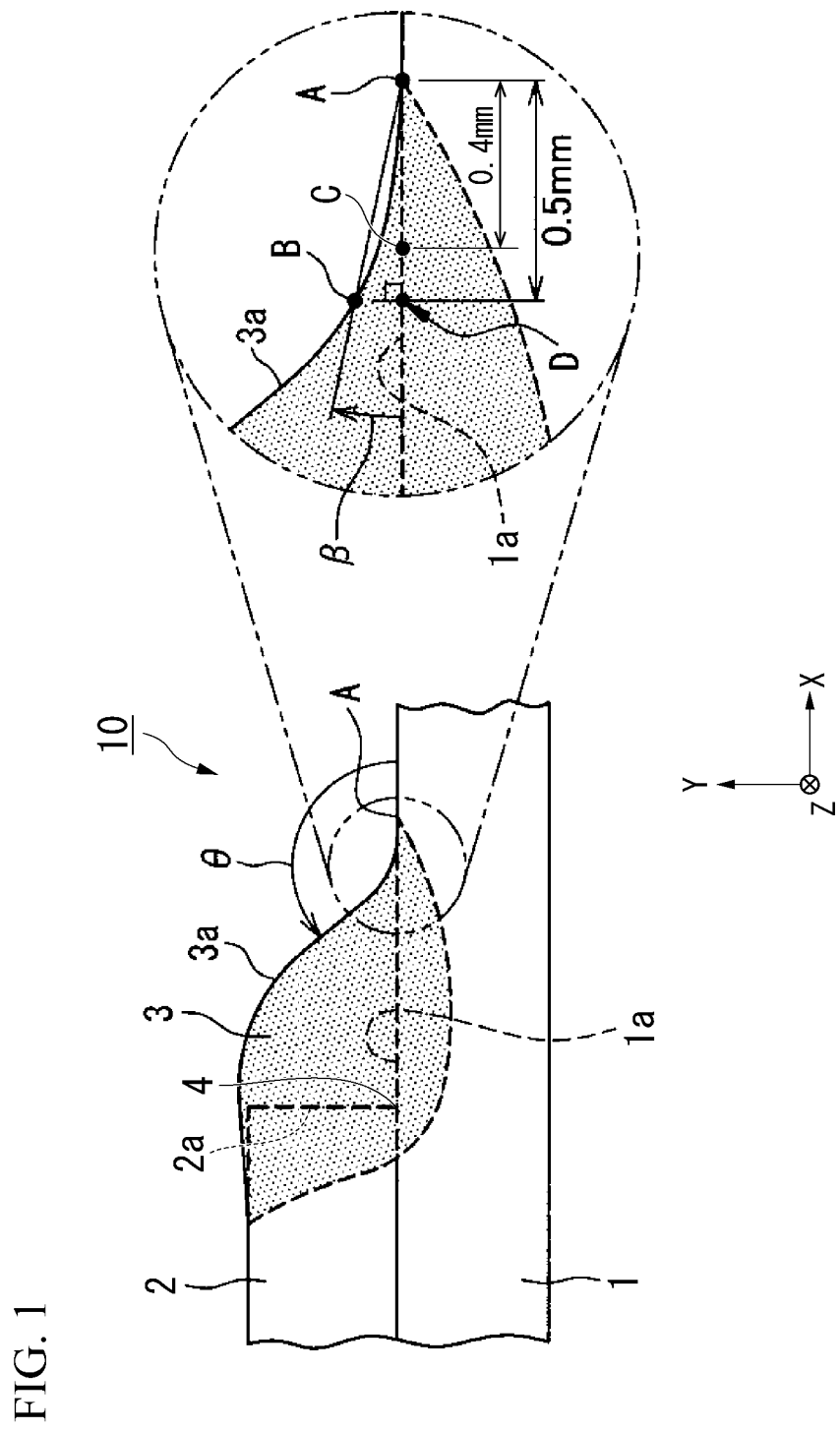
FIG. 1 is a cross-sectional view of a lap fillet arc welded joint according to an embodiment of the present invention.
Figure 2:
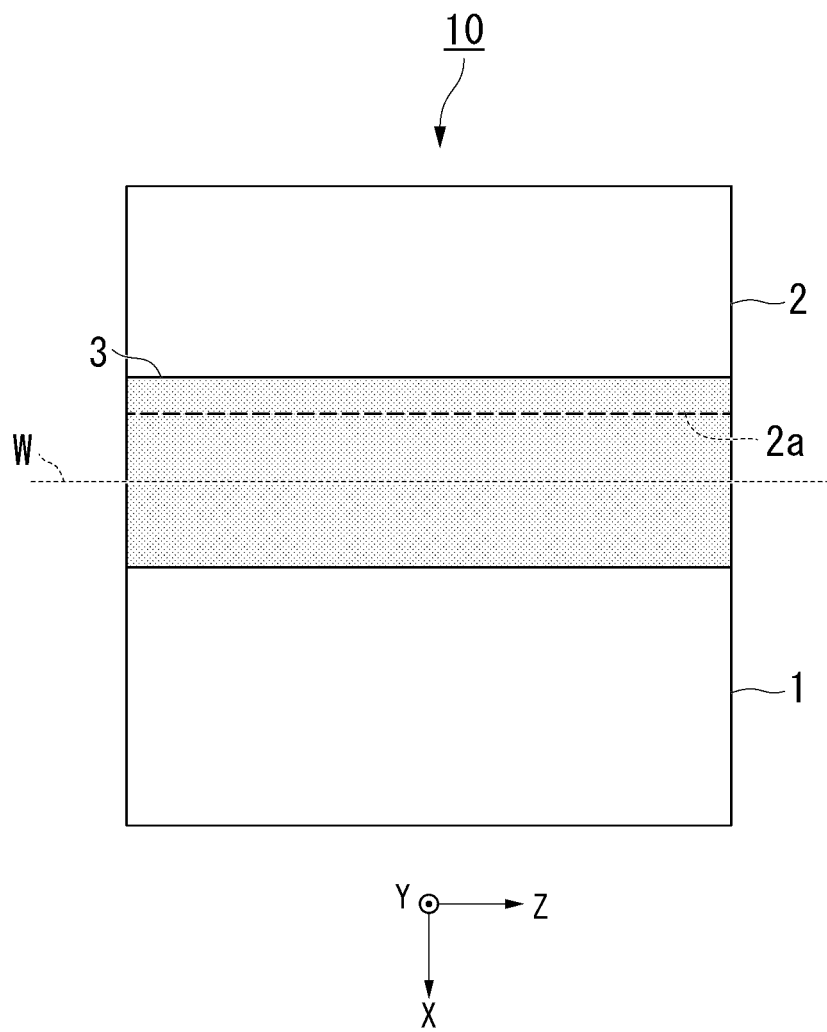
FIG. 2 is a plane view of a lap fillet arc welded joint according to an embodiment of the present invention.

FIG. 1 is a cross-sectional view of a lap fillet arc welded joint 10 according to the present embodiment. FIG. 2 is a plane view of the lap fillet arc welded joint 10 according to the present embodiment. As shown in FIG. 1 and FIG. 2, the lap fillet arc welded joint 10 according to the present embodiment includes: a first steel sheet 1 and a second steel sheet 2 which are overlapped each other; and a weld metal (weld bead) 3 which extends along a corner 4 formed by an upper surface 1a of the first steel sheet 1 and an end surface 2a of the second steel sheet 2.

In addition, FIG. 1 is a view of the lap fillet arc welded joint 10 as seen in a cross section orthogonal to a weld line W (see FIG. 2) of the weld metal 3. Additionally, as shown in FIG. 1 and FIG. 2, a direction parallel to the weld line W is defined as a Z-axis direction, a direction orthogonal to the Z-axis direction and parallel to the upper surface 1a of the first steel sheet 1 is defined as a X-axis direction, and a direction orthogonal to the X-axis direction and the Z-axis direction and parallel to a thickness direction of the first steel sheet 1 is defined as a Y-axis direction.

Each of the first steel sheet 1 and the second steel sheet 2 is a base steel sheet of the lap fillet arc welded joint 10, and has a tensile strength of 950 MPa or more. The first steel sheet 1 and the second steel sheet 2 each having such the high tensile strength are suitable as the base steel sheets of the lap fillet arc welded joint 10 for automobiles that are particularly required to be lighter and to improve collision safety. In order to achieve both reduction in weight of the automobile and improvement in collision safety, it is preferable that each of the first steel sheet 1 and the second steel sheet 2 has a thickness of 0.8 mm to 3.5 mm.

The component composition of the first steel sheet 1 and the second steel sheet 2 is not particularly limited as long as a mechanical characteristic of a tensile strength of at least 950 MPa can be obtained. As a suitable example, each of the first steel sheet 1 and the second steel sheet 2 preferably contains, by mass %, C: 0.01% to 0.25%, Si: 0.01% to 2.0%, Mn: 0.1% to 3.0%, P: 0.05% or less, and S: 0.0005% to 0.01%.

The weld metal 3 is a weld bead that is formed by continuously performing the fillet arc welding along the corner 4 in the Z-axis direction in a state that the first steel sheet 1 is overlapped with the second steel sheet 2. As explained below, in the present embodiment, improvement of the fatigue strength of the lap fillet arc welded joint 10 is realized by controlling the hardness of the weld metal 3, the toe portion shape of the weld metal 3, and the relationship between the surface shape of the weld metal 3 and the ferrite structure so as to satisfy specific conditions respectively.

[Hardness of Weld Metal 3]

The Vickers hardness of the weld metal 3 is 400 HV or less. When the Vickers hardness of the weld metal 3 exceeds 400 HV, hydrogen embrittlement cracks occur in the weld metal 3. In other words, it is possible to suppress the hydrogen embrittlement cracks from occurring in the weld metal 3 by limiting the Vickers hardness of the weld metal 3 to 400 HV or less. In addition, the Vickers hardness of the weld metal 3 is measured at five points or more along a straight line which is parallel to the X-axis direction and passes through a position at a depth of 0.1 mm from the upper surface 1a of the first steel sheet 1. An average of these measured results is defined as the Vickers hardness of the weld metal 3.

[Toe Portion Shape of Weld Metal 3]

As shown in FIG. 1, when a position of a fusion boundary present on the upper surface 1a of the first steel sheet 1 is defined as a point A, the weld metal 3 rises from the point A with a toe angle β and rises from a position closer to the second steel sheet 2 from the point A with a flank angle θ. The flank angle θ is generally used as a parameter indicating the toe portion shape of the weld metal 3. However, in the present embodiment, the toe angle ρ is used as a parameter indicating the toe portion shape of the weld metal 3. The toe angle β is defined as described below.

As shown in FIG. 1, in the X-axis direction, a position 0.5 mm away from the point A toward the weld metal 3 is defined as a point D. Additionally, an intersection point between a surface of the weld metal 3 and a straight line which passes through the point D and extends in the thickness direction (that is, the Y-axis direction) of the first steel sheet 1 is defined as a point B. When the point B and the point D are defined as described above, an angle between a straight line connecting the point A with the point B and a straight line connecting the point A with the point D is defined as the toe angle β of the weld metal 3.

When the toe angle β is defined as described above, the weld metal 3 of the lap fillet arc welded joint 10 satisfies the following conditional expression (1). Since the toe portion shape of the weld metal 3 becomes a gentle shape by satisfying the conditional expression (1), it is possible to suppress stresses from concentrating at the toe portion of the weld metal 3. In a case that the toe angle β is 30° or more, since the toe portion shape of the weld metal 3 becomes a steep shape, stresses tend to concentrate at the toe portion of the weld metal 3.

$$0° < \beta < 30° \quad (1)$$

Figure 3:
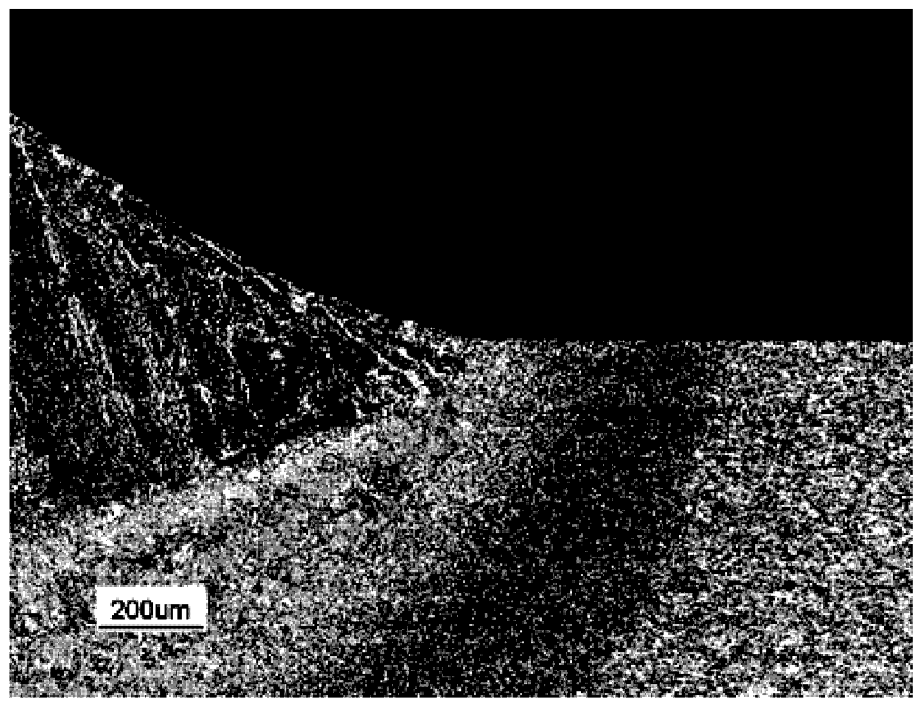
FIG. 3 is a cross-sectional photograph of a weld metal obtained by an optical microscope.

In FIG. 1, for convenience of explanation, the upper surface 1a of the first steel sheet 1 and the end surface 2a of the second steel sheet 2 which are included within the weld metal 3 are indicated by dotted lines in order to indicate the position of the corner 4. However, actually, the portions indicated by the dotted lines are dissolved within the weld metal 3. Therefore, for example, as shown in FIG. 3, even if a cross-sectional photograph of the weld metal 3 is obtained using an optical microscope, it is impossible to observe the portions indicated by the dotted lines. Accordingly, by specifying the three points A, B, and D defined as described above on the cross-sectional photograph of the weld metal 3, it is possible to easily obtain the toe angle ρ of the weld metal 3 from the cross-sectional photograph of the weld metal 3. In addition, not only the optical microscope but also a scanning electron microscope (SEM) or a microscope may be used as long as a photograph capable of specifying the toe angle β of the weld metal 3 can be obtained.

[Relationship Between Surface Shape of Weld Metal 3 and Ferrite Structure]

Figure 12:
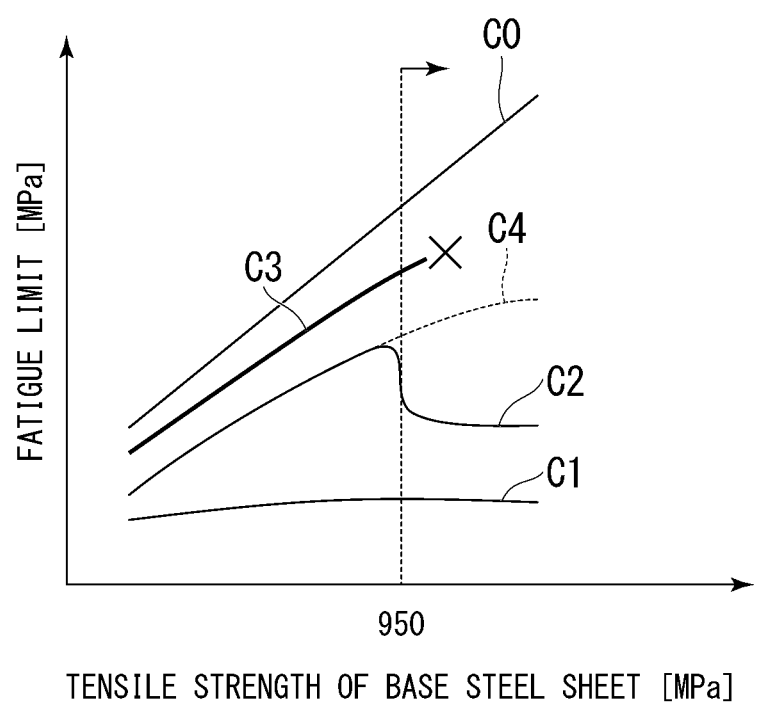
FIG. 12 is a graph showing the relationship between the fatigue strength (fatigue limit) of the lap fillet arc welded joint and the tensile strength of the base steel sheet, with the shape of the weld toe portion as a parameter.
Figure 13:
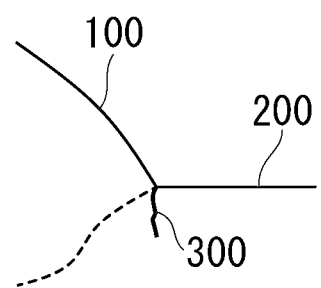
FIG. 13 is a schematic view of a joint portion between the weld metal having a steep toe shape and the base steel sheet as seen in a cross section orthogonal to a weld line of the weld metal.
Figure 14:
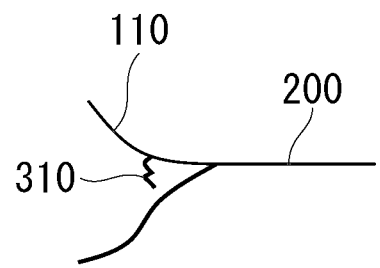
FIG. 14 is a schematic view of a joint portion between the weld metal having the gentle toe shape and the base steel sheet as seen in a cross section orthogonal to a weld line of the weld metal.

As described above, it is possible to suppress stresses from concentrating at the toe portion of the weld metal 3 by controlling the toe portion shape of the weld metal 3 into a gentle shape. However, as explained using FIG. 12, with this approach only, it is difficult to increase the fatigue strength of the lap fillet arc welded joint 10 manufactured by base steel sheets each having the tensile strength of 950 MPa or more. Therefore, in the present embodiment, in order to increase the fatigue strength of the lap fillet arc welded joint 10, the microscopic surface shape of the weld metal 3 and the ferrite structure present on the surface of the weld metal 3 are controlled so as to satisfy the following conditional expression (2).

As shown in FIG. 1, in the X-axis direction, a position 0.4 mm away from the point A toward the weld metal 3 is defined as a point C. The total number of concave portions present on the surface of the weld metal 3 included within a range between the point A and the point C is defined as NA. Among the concave portions, the number of concave portions in contact with ferrite grains having a maximum grain size of 10 or more is defined as NB. When NA and NB are defined as described above, the weld metal 3 of the lap fillet arc welded joint 10 satisfies the following conditional expression (2).

$$NB/NA \leq 0.70 \quad (2)$$

(Here, NA is 20 or more.)

Figure 4:
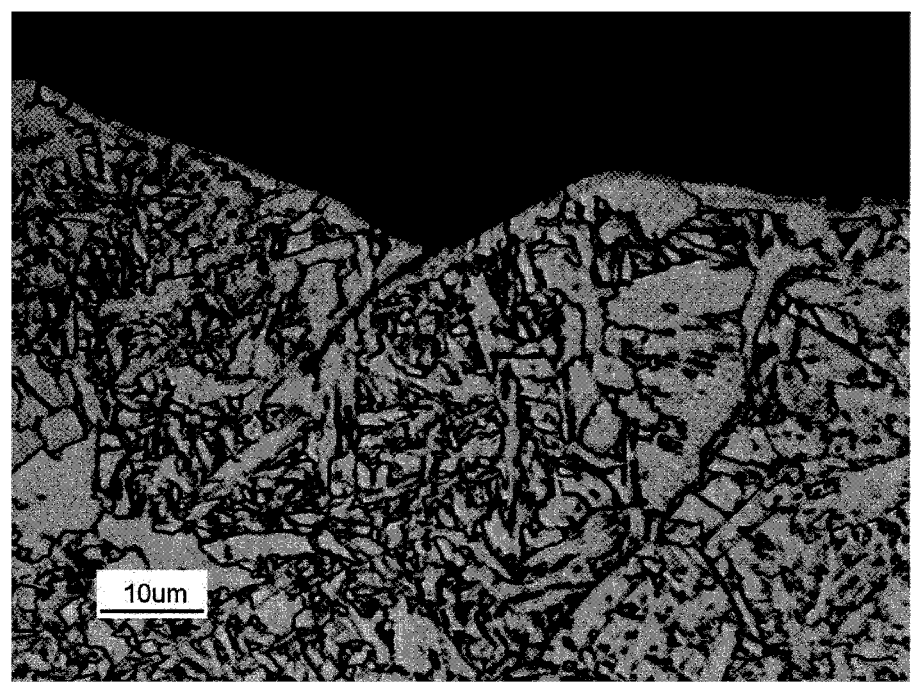
FIG. 4 is a cross-sectional photograph showing that a fatigue crack occurs from a concave portion present on a surface of a weld metal.

As already mentioned, when the tensile strength of the base steel sheet is 950 MPa or more, a composite structure of ferrite and bainite (or martensite) is generated on the surface of the weld metal. Therefore, it is considered that stress and strain tend to concentrate on soft ferrite due to the difference in strength between structures having different hardnesses. As shown in FIG. 4, as a result of the research by the present inventors, it has been found that the fatigue cracks tend to occur from micro concave portions present on the surface of the weld metal included within a range of 0.4 mm or less from the point A which is the fusion boundary. Therefore, the present inventors have further researched a relationship between the fatigue strength and size of ferrite in contact with the concave portion present on the surface of the weld metal.

As a result, it has been found that when a maximum grain size of ferrite in contact with the concave portion is 10 μm or more, the concave portion is likely to become a starting point where the fatigue crack occurs. Additionally, when a ratio of the number NB of concave portions in contact with ferrite grains having a maximum grain size of 10 μm or more with respect to the total number NA of concave portions present on the surface of the weld metal included within a range of 0.4 mm or less from the point A which is the fusion boundary is 0.7 or less, the number of the starting points of the fatigue cracks is reduced. As a result, as shown by a dotted line C4 in FIG. 12, it has been found that even if the tensile strength of the base steel sheet is 950 MPa or more, the fatigue strength of the lap fillet arc welded joint increases. In addition, the above research results have been obtained on the precondition that the shape of the toe portion of the weld metal is controlled into a gentle shape.

As described above, even when the first steel sheet 1 and the second steel sheet 2 each having the tensile strength of 950 MPa or more are used as the base steel sheets, it is possible to increase the fatigue strength of the lap fillet arc welded joint 10 by satisfying the conditional expressions (1) and (2) at the same time. In addition, in the conditional expression (2), when NB/NA exceeds 0.70, the number of the concave portions which become the starting points of the fatigue cracks (that is, the number of the concave portions in contact with ferrite grains having a maximum grain size of 10 μm or more) increases, thereby the fatigue strength of the lap fillet arc welded joint 10 is reduced. The lower limit value of NB/NA is theoretically zero, but it is practically difficult to make NB zero. However, the smaller the value of NB/NA, the greater the effect of improving fatigue strength.

Hereinafter, a method of specifying the total number NA of concave portions present on the surface of the weld metal 3 included within a range between the point A and the point C will be described. Additionally, a method of specifying the number NB of concave portions in contact with ferrite grains having a maximum grain size of 10 μm or more will be also described.

Figure 5:
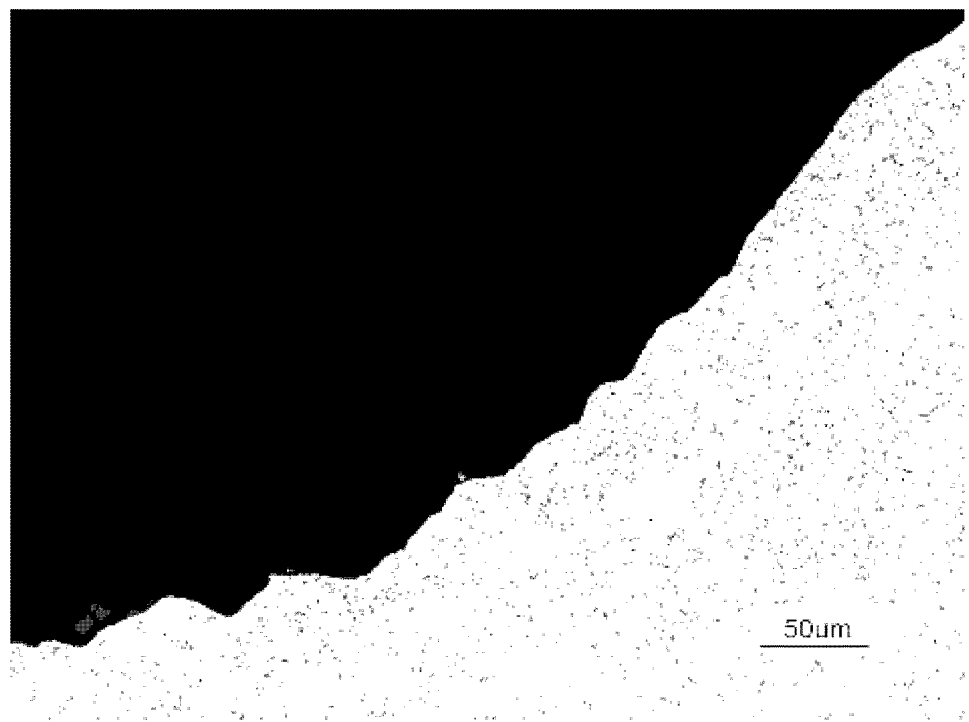
FIG. 5 is a first explanatory view with respect to a method of specifying NA and NB included in a conditional expression (2).

Firstly, a portion including the weld metal 3 is cut out from the lap fillet arc welded joint 10 as a sample, and then the sample is cut so that a cross section of the weld metal 3 (cross section orthogonal to the weld line W) is exposed. After the cut surface of the sample is mirror-polished, the cross section of the weld metal 3 included within at least a range of 0.4 mm or less from a fusion boundary (point A) is photographed by an optical microscope, thereby a cross-sectional photograph of the weld metal 3 as shown in FIG. 5 is obtained. Not only the optical microscope but also a SEM or a microscope may be used as long as a photograph capable of identifying minute unevenness present on the surface of the weld metal 3 can be obtained. There is the fusion boundary at a left end in the cross-sectional photograph of FIG. 5. The cross section of the weld metal 3 included within the range of 0.4 mm or less from the fusion boundary is included in the photograph.

Figure 6:
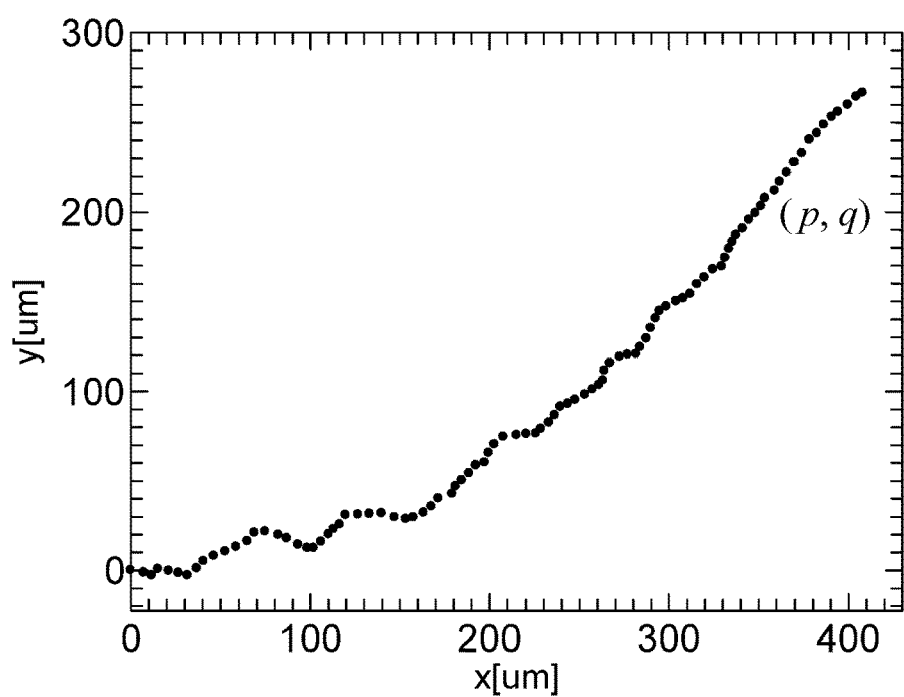
FIG. 6 is a second explanatory view with respect to a method of specifying NA and NB included in a conditional expression (2).
Figure 7:
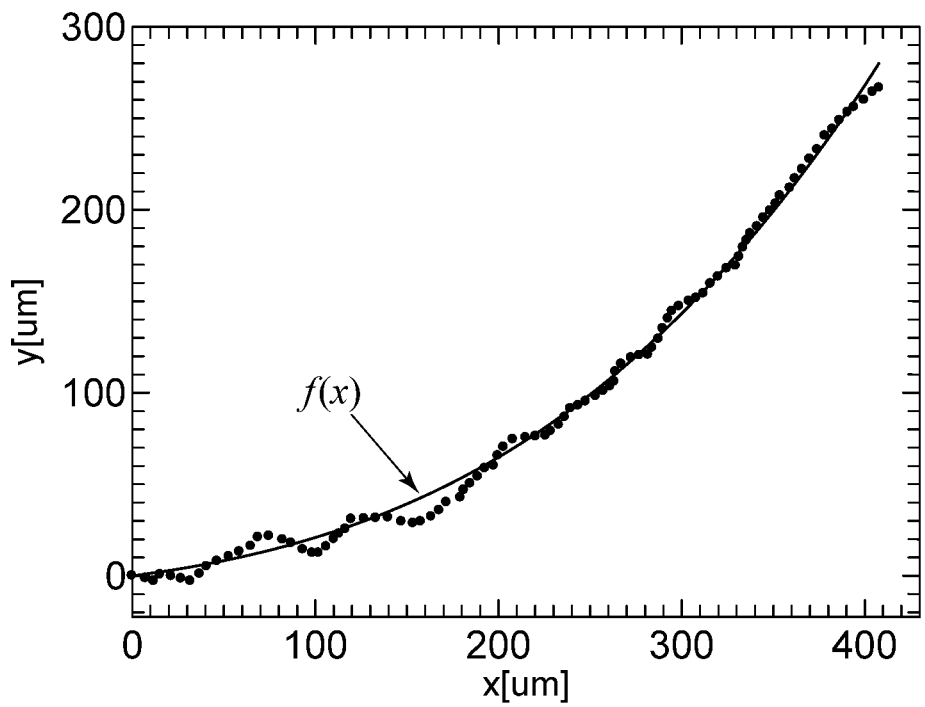
FIG. 7 is a third explanatory view with respect to a method of specifying NA and NB included in a conditional expression (2).

Subsequently, based on the cross-sectional photograph of the weld metal 3, the surface shape of the weld metal 3 included within a range of 400 μm or more from the melting boundary is traced with fifty or more plotted points, thereby a point graph representing the macroscopic surface shape of the weld metal 3 as shown in FIG. 6 is created. In the point graph of FIG. 6, the xy coordinate system composed of the horizontal axis x and the vertical axis y corresponds to the XY coordinate system of FIG. 1. Next, as shown in FIG. 7, based on the point graph, an approximate curve f(x) which is a cubic function representing the macroscopic surface shape of the weld metal 3 is created by the least square method. The reason why the approximate curve f(x) is defined as a cubic function is because the macroscopic toe portion shape gradually rises from the direction along the base material (first steel sheet 1) and has a cubic function-like change behavior in which the inclination becomes gentle toward the top of the weld metal 3.

Figure 8:
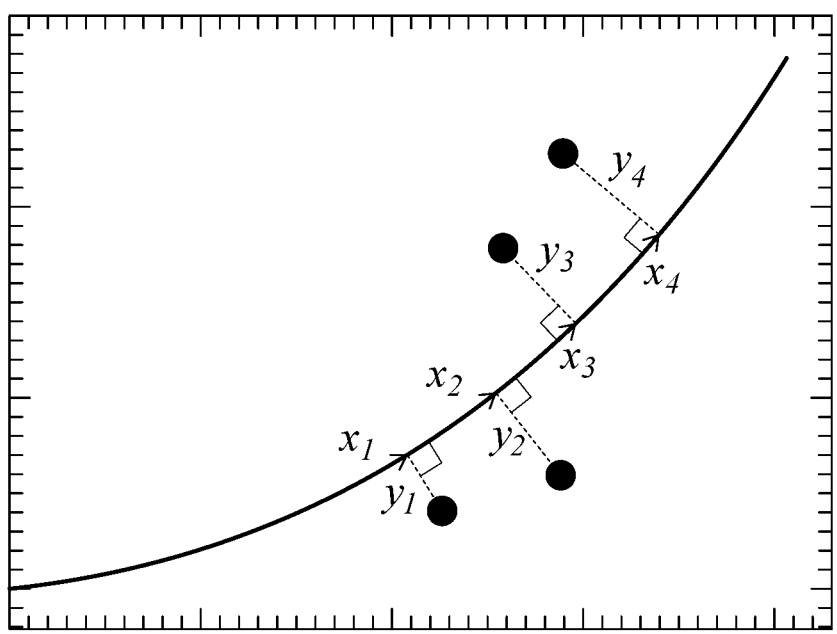
FIG. 8 is a fourth explanatory view with respect to a method of specifying NA and NB included in a conditional expression (2).

Then, as shown in FIG. 8, a normal line is drawn from each traced point to the approximate curve f(x), and the length of each normal line is obtained as yi. Assuming that the coordinate of each traced point is (p, q), the length yi of each normal line is obtained by the following expression (3). A minus sign is attached to the length yi of the normal line of the point located below the approximate curve f(x). The right side min( ) of the expression (3) means the minimum value in parentheses, and can be obtained by convergence calculation or the like.

[Math 1]

$$y_i = \min(\sqrt{(x-p)^2 + \{f(x)-q\}^2})) \quad (3)$$

Additionally, the length of the approximate curve f(x) from the intersection of the normal line and the approximate curve f(x) to the fusion boundary is determined as xi. This xi is obtained by the following expression (4) as the length of the arbitrary section [0, a] of the approximate curve f(x).

[Math 2]

$$x_i \int_0^a \sqrt{1 + \{f'(x)\}^2} dx \quad (4)$$

Figure 9:
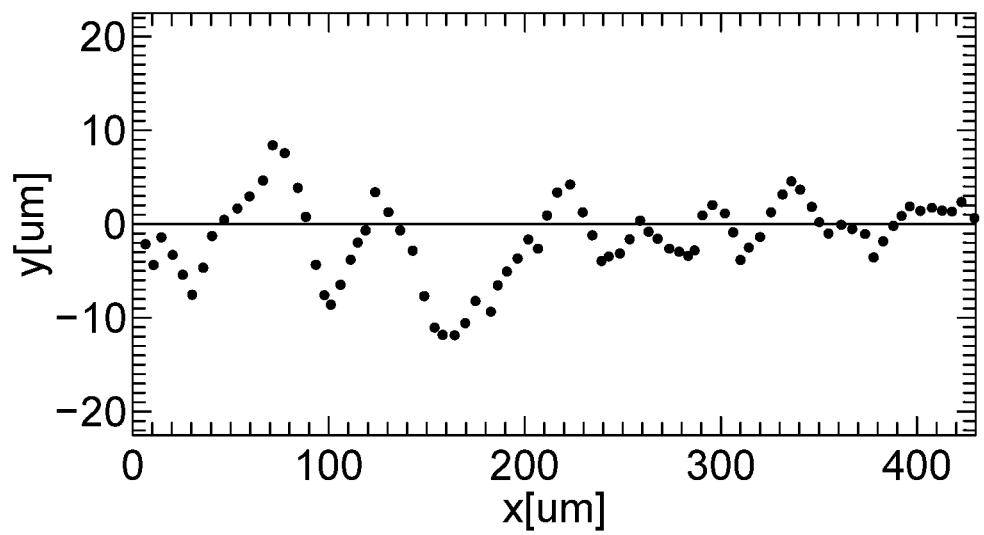
FIG. 9 is a fifth explanatory view with respect to a method of specifying NA and NB included in a conditional expression (2).

Next, by plotting the data of xi and yi obtained by the above method on a graph in the xy coordinate system, a point graph representing the unevenness present on the surface of the weld metal 3 as shown in FIG. 9 is created. In the point graph shown in FIG. 9, a portion where the y-axis value becomes a minimum value (portion that becomes a valley) is a concave portion present on the surface of the weld metal 3 included within a range of 0.4 mm from the fusion boundary (point A). The NA is calculated by counting the number of the concave portions.

Then, while comparing the portion identified as the concave portion in the point graph shown in FIG. 9 with the cross-sectional photograph of the weld metal 3 shown in FIG. 5, the number of the concave portions in contact with the ferrite grains having a maximum grain size of 10 μm or more is counted, thereby the NB is calculated.

The maximum grain size of the ferrite grain is defined as a length of the longest straight line that can be drawn from an end point located on the surface of the weld metal 3 within the ferrite grain. The wording "the concave portion in contact with the ferrite grain" means that at least a portion of the ferrite grain present on the surface of the weld metal 3 included within a range of the x coordinate ±10 μm from the minimum value of the point graph shown in FIG. 9.

The NA and NB included in the conditional expression (2) can be specified by the above method. In order to reliably obtain the effect of improving the fatigue strength by the conditional expression (2), the NA needs to be 20 or more. However, this does not mean that the NA obtained from one cross-sectional photograph must be 20 or more. The NA obtained from a plurality of cross-sectional photographs taken at different positions along the weld line W may be 20 or more in total. When calculating NA from a plurality of cross-sectional photographs, it is also necessary to calculate NB from the plurality of cross-sectional photographs. For example, when the NA obtained from the two cross-sectional photographs is 20 or more in total, the total value of the NB obtained from the first cross-sectional photograph and the NB obtained from the second cross-sectional photograph is used as a final value of NB.

As described above, according to the lap fillet arc welded joint 10 having the weld metal 3 which satisfies the conditional expressions (1) and (2) at the same time, even when the first steel sheet 1 and the second steel sheet 2 each having the tensile strength of 950 MPa or more are used as base materials, improvement of the fatigue strength can be realized. Additionally, since the Vickers hardness of the weld metal 3 is a hardness capable of suppressing hydrogen embrittlement cracks from occurring, the overall strength of the lap fillet arc welded joint 10 can be also prevented from being reduced due to hydrogen embrittlement cracks.

In addition, in the lap fillet arc welded joint 10, in order to reduce local concentration of stress and strain due to the difference in hardness generated in the vicinity of the fusion boundary, the ratio of the Vickers hardness of the weld metal 3 to the Vickers hardness of the base steel sheet (first steel sheet 1) may be 0.7 or more. In the weld metal 3 of the lap fillet arc welded joint 10 manufactured by base steel sheets each having the tensile strength of 950 MPa or more, there is a possibility that the hardness of the HAZ softened portion is reduced to about 60% with respect to the hardness of the base material. Therefore, by limiting the lower limit of the hardness of the weld metal 3 to 70% of the hardness of the base material, it is possible to suppress the occurrence of tensile fracture in the weld metal 3. In addition, the Vickers hardness of the first steel sheet 1 is measured at five points or more along a straight line which is parallel to the X-axis direction and passes through a position at a depth of 0.1 mm from the upper surface 1a of the first steel sheet 1. An average of these measured results is defined as the Vickers hardness of the first steel sheet 1.

[Manufacturing Conditions of Lap Fillet Arc Welded Joint 10]

The lap fillet arc welded joint 10 according to the present embodiment can be manufactured under the manufacturing conditions described below.

The Vickers hardness of the weld metal 3 is represented by the following expression (5). Ceq included in the expression (5) is represented by the following expression (6). Therefore, in order to limit the Vickers hardness of the weld metal 3 to 400 HV or less, the value of Ceq may be controlled so that the Vickers hardness Hmax of the weld metal 3 represented by the following expression (5) becomes 400 HV or less. More specifically, by adjusting the component composition of the base steel sheets and the welding wire, the content (unit: mass %) of C, Si, Mn, Cr, Mo, Ti, and Nb contained within the weld metal 3 may be controlled so that the value of Ceq is about 0.406 or less.

[Math 3]

$$H_{max} = 769 C_{eq} + 88 \leq 400 \quad (5)$$

$$C_{eq} = C + Si/97 + Mn/21 + Cr/13 + Mo/17 + Ti/2 + Nb/8 \quad (6)$$

In order to obtain the weld metal 3 with a small amount of coarse ferrite, it is desirable that no ferrite is generated inside the weld metal 3 in the first place. Therefore, in the weld metal 3, it is necessary that the content of Si, Al, Cr, and Mo that are ferrite forming elements is small and the content of Mn, Ni, C, and N that are austenite forming elements is large.

Specifically, it is necessary that not only the value of Cx obtained from the following expression (7) is −0.4 or more but also the weld metal 3 contains, by mass %, Ti: 0.05% to 1.0% and B: 0.0003% to 0.03%. By adjusting the component composition of the base steel sheet and the welding wire, the component of the weld metal 3 is controlled so as to satisfy the above conditions, thereby $TiO_2$ becomes a transformation nucleus to refine the ferrite, and B segregates at the prior austenite grain boundary to suppress the formation of grain boundary ferrite. As a result, the weld metal 3 with a small amount of coarse ferrite can be obtained.

[Math 4]

$$C_x = C - 0.92Si + 0.21Mn - 1.15Al + 0.84N|0.16Cr + 0.26Ni - 0.46Mo \quad (7)$$

Figure 10:
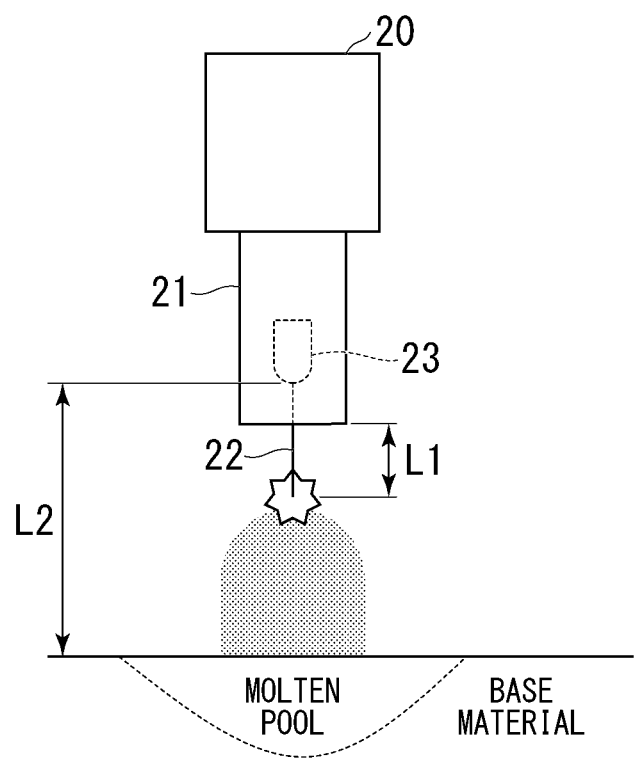
FIG. 10 is an explanatory view with respect to welding conditions of a lap fillet arc welding.

As described above, a small amount of oxygen is required to realize the refinement of ferrite by intragranular transformation with $TiO_2$ as the nucleus. As shown in FIG. 10, when the lap fillet arc welding is performed, the periphery of the arc is shielded by the shielding gas supplied from the shielding gas nozzle 21 provided at the welding torch 20. At this time, a small amount of oxygen is mixed into the shielding gas. Generally, Ar, $CO_2$, or a mixed gas of Ar and $CO_2$ is used as the shielding gas. O (oxygen) generated by the ionization of $CO_2$ in the arc space and oxygen mixed by the entrainment of air affect the oxygen content of the weld metal. In order to stably generate $TiO_2$ in the weld metal, it is important to control the amount of oxygen mixed in the shield gas to an appropriate value.

Furthermore, the curvature radius of the concave portion on the surface of the weld metal is smaller as the surface tension is lower, and is larger as the surface tension is higher. Regarding the relationship between the fatigue strength and the curvature radius of the concave portion, a concave portion having a lower surface tension and a smaller curvature radius is more likely to be a starting point of a fatigue crack, and a concave portion having a larger curvature radius is less likely to be a starting point of a fatigue crack. Therefore, the ratio of ferrite grains having a maximum grain size of 10 μm or more in contact with the concave portions becomes important. When the curvature radius of the concave portion is 13 μm or less, it tends to be the starting point of the fatigue crack.

Oxygen mixed in the shielding gas affects the surface tension of the molten pool. In that sense as well, it is important to control the amount of oxygen mixed in the shielding gas within an optimal range.

In order to control the amount of oxygen mixed in the shield gas to an appropriate value for refining the ferrite and controlling of the concave portion on the surface of the weld metal, it is desirable that a distance L1 is 5 mm to 20 mm and a distance L2 is 8 mm to 30 mm. The distance L1 is a distance (wire protrusion length) from the tip of the shield gas nozzle 21 to the tip of the welding wire 22. The distance L2 is a distance between the surface of the base material and the contact chip 23 for flowing an electric current through the welding wire 22. Additionally, when an arc is generated in the vicinity of the base material, fluctuation of the molten pool increases, thereby ripples (wave patterns generated in the molten pool) that cause micro unevenness increase. Therefore, it is desirable that L2−L1≥1 mm. When L2−L1<1 mm, many concave portions having a depth exceeding 10 μm are formed, thereby fatigue cracks starting from the concave portions are likely to occur.

When the distances L1 and L2 exceed the respective upper limit values, the shielding performance around the arc deteriorates, thereby excessive oxygen is mixed. As a result, Oxygen content of the weld metal 3 increases and a large amount of oxide precipitates, thereby coarse ferrite such as grain boundary ferrite tends to be generated due to a decrease in the hardenability of the weld metal 3. On the other hand, when the distances L1 and L2 are less than the respective lower limit values, the contact chip 23 may be burned out or the welding torch 20 may be damaged due to fume and spatter adhesion.

When performing the lap fillet arc welding, in addition to the above welding conditions, the welding speed is set to 60 to 150 cm/min, and the welding current is set to 150 to 250 A. Thereby it is possible not only to control the toe portion shape of the weld metal 3 into a gentle shape so as to satisfy the expression (1) but also to control the relationship between the concave portion and the ferrite grain size so as to satisfy the expression (2).

The lap fillet arc welded joint 10 according to the present embodiment can be manufactured under the manufacturing conditions as described above. In this case, the following two conditions are required for the welding wire.

(a) The contents of C, Si, Mn, Cr, Mo, Ti, and Nb contained in the weld metal 3 can be controlled so that the value of Ceq is about 0.406 or less.

(b) The value of Cx becomes −0.4 or more, and the contents of Ti and B contained in the weld metal 3 can be controlled to Ti: 0.05% to 1.0% and B: 0.0003% to 0.03%.

Therefore, since a relatively low-strength welding wire can be used as a welding wire for manufacturing the lap fillet arc welding joint 10, it is not necessary to use a high-strength welding wire that causes hydrogen embrittlement cracks. For example, when improving the fatigue strength of a 950 MPa grade steel sheet using a high-strength welding wire, it is necessary to use a high-strength welding wire having a weld metal strength of 950 MPa or more. However, according to the present embodiment, since a welding wire having a weld metal strength of 540 MPa or more can be used, not only an increase in the manufacturing cost of the lap fillet arc welded joint 10 can be suppressed but also the occurrence of hydrogen embrittlement cracks due to the strengthening of the weld metal 3 can be suppressed.

EXAMPLES

First, three types of steel sheets having the component compositions shown in Table 1 and two types of welding wires having the component compositions shown in Table 2 were prepared. Each of the three types of steel sheets was a steel sheet having a thickness of 2.9 mm and a tensile strength of 956 MPa. Among the two types of welding wires, No. A of the welding wire had a component composition satisfying two conditions required for manufacturing the lap fillet arc welded joint of the present invention. On the other hand, No. B of the welding wire was a comparative welding wire and did not have a component composition satisfying the two required conditions.

TABLE 1

| Steel sheet No. | Component composition (mass %) | | | | | | | |
|---|---|---|---|---|---|---|---|---|
| | C | Si | Mn | P | S | Al | Ti | B |
| 1 | 0.14 | 1.2 | 2 | 0.01 | 0.001 | 0.03 | 0.12 | 0 |
| 2 | 0.08 | 1.3 | 2.2 | 0.01 | 0.001 | 0.03 | 0.1 | 0 |
| 3 | 0.1 | 0.8 | 1.2 | 0.01 | 0.001 | 0.3 | 0.13 | 0.002 |

TABLE 2

| Weld wire No. | Component composition (mass %) | | | | | | | | | | |
|---|---|---|---|---|---|---|---|---|---|---|---|
| | C | Si | Mn | P | S | Al | Ti | B | Cr | Ni | Mo |
| A | 0.05 | 0.5 | 1.6 | 0.01 | 0.01 | 0.002 | 0.08 | 0.004 | 0.04 | 0.01 | 0.01 |
| B | 0.06 | 0.6 | 1.4 | 0.01 | 0.01 | 0.002 | 0 | 0 | 0.03 | 0.01 | 0.01 |

Subsequently, No. 1 of the steel sheet was used as a base material, and a lap fillet arc welded joint of Example 1 (test code 1-A-WC1) was obtained by performing the lap fillet arc welding using No. A of the welding wire under the welding condition WC1. Additionally, No. 1 of the steel sheet was used as a base material, and a lap fillet arc welded joint of Comparative Example 1 (test code 1-B-WC1) was obtained by performing the lap fillet arc welding using No. B of the welding wire under the welding condition WC1.

As shown in Table 3, under the welding condition WC1, the welding speed was set to 80 cm/min, the welding current was set to 235 A, the wire protrusion length L1 was set to 10 mm, the distance L2 between the contact chip and the base material was set to 20 mm, and a mixed gas of Ar and 20% $CO_2$ was used as a shielding gas.

Similarly, No. 2 of the steel sheet was used as a base material, and a lap fillet arc welded joint of Example 2 (test code 2-A-WC1) was obtained by performing the lap fillet arc welding using No. A of the welding wire under the welding condition WC1. Additionally, No. 2 of the steel sheet was used as a base material, and a lap fillet arc welded joint of Comparative Example 2 (test code 2-B-WC1) was obtained by performing the lap fillet arc welding using No. B of the welding wire under the welding condition WC1.

Similarly, No. 3 of the steel sheet was used as a base material, and a lap fillet arc welded joint of Example 3 (test code 3-A-WC1) was obtained by performing the lap fillet arc welding using No. A of the welding wire under the welding condition WC1. Additionally, No. 3 of the steel sheet was used as a base material, and a lap fillet arc welded joint of Comparative Example 3 (test code 3-B-WC1) was obtained by performing the lap fillet arc welding using No. B of the welding wire under the welding condition WC1.

In addition, No. 1 of the steel sheet was used as a base material, and a lap fillet arc welded joint of Comparative Example 4 (test code 1-A-WC2) was obtained by performing the lap fillet arc welding using No. A of the welding wire under the welding condition WC2.

As shown in Table 3, under the welding condition WC2, the welding speed was set to 160 cm/min, the welding current was set to 270 A, the wire protrusion length L1 was set to 10 mm, the distance L2 between the contact chip and the base material was set to 20 mm, and a mixed gas of Ar and 20% $CO_2$ was used as a shielding gas.

Furthermore, No. 1 of the steel sheet was used as a base material, and a lap fillet arc welded joint of Comparative Example 5 (test code 1-A-WC3) was obtained by performing the lap fillet arc welding using No. A of the welding wire under the welding condition WC3.

As shown in Table 3, under the welding condition WC3, the welding speed was set to 80 cm/min, the welding current was set to 235 A, the wire protrusion length L1 was set to 25 mm, the distance L2 between the contact chip and the base material was set to 35 mm, and a mixed gas of Ar and 20% $CO_2$ was used as a shielding gas.

Similarly, No. 2 of the steel sheet was used as a base material, and a lap fillet arc welded joint of Comparative Example 6 (test code 2-A-WC3) was obtained by performing the lap fillet arc welding using No. A of the welding wire under the welding condition WC3. Additionally, No. 3 of the steel sheet was used as a base material, and a lap fillet arc welded joint of Comparative Example 7 (test code 3-A-WC3) was obtained by performing the lap fillet arc welding using No. A of the welding wire under the welding condition WC3.

TABLE 3

| Welding condition No. | Welding speed (cm/min) | Welding current (A) | L1 (mm) | L2 (mm) | Shielding gas |
|---|---|---|---|---|---|
| WC1 | 80 | 235 | 10 | 20 | Ar + 20% $CO_2$ |
| WC2 | 160 | 270 | 10 | 20 | Ar + 20% $CO_2$ |
| WC3 | 80 | 235 | 25 | 35 | Ar + 20% $CO_2$ |

Samples for measuring the components of the weld metal were collected from each of the lap fillet arc welded joints of Examples 1 to 3 and the lap fillet arc welded joints of Comparative Examples 1 to 7 obtained as described above. Then the component of the weld metal was measured for each sample. Table 4 shows the measurement results of the components of the weld metal.

TABLE 4

| | Test code | Component composition of weld metal (mass %) | | | | | | | | | | | | |
|---|---|---|---|---|---|---|---|---|---|---|---|---|---|---|
| | | C | Si | Mn | P | S | Al | Ti | B | Cr | Ni | Mo | Cx | Ti, B |
| Example 1 | 1-A-WC1 | 0.09 | 0.78 | 1.8 | 0.01 | 0.006 | 0.013 | 0.096 | 0.0024 | 0.024 | 0.006 | 0.006 | −0.28 | Y |
| Comparative Example 1 | 1-B-WC1 | 0.09 | 0.84 | 1.6 | 0.01 | 0.006 | 0.013 | 0.049 | 0 | 0.018 | 0.006 | 0.006 | −0.35 | N |
| Example 2 | 2-A-WC1 | 0.06 | 0.82 | 1.8 | 0.01 | 0.006 | 0.013 | 0.088 | 0.0024 | 0.024 | 0.006 | 0.006 | −0.33 | Y |
| Comparative Example 2 | 2-B-WC1 | 0.07 | 0.88 | 1.7 | 0.01 | 0.006 | 0.013 | 0.041 | 0 | 0.018 | 0.006 | 0.006 | −0.4 | N |
| Example 3 | 3-A-WC1 | 0.07 | 0.62 | 1.4 | 0.01 | 0.006 | 0.121 | 0.1 | 0.0032 | 0.024 | 0.006 | 0.006 | −0.34 | Y |
| Comparative Example 3 | 3-B-WC1 | 0.08 | 0.68 | 1.3 | 0.01 | 0.006 | 0.121 | 0.053 | 0.0008 | 0.018 | 0.006 | 0.006 | −0.42 | Y |
| Comparative Example 4 | 1-A-WC2 | 0.09 | 0.78 | 1.8 | 0.01 | 0.006 | 0.013 | 0.096 | 0.0024 | 0.024 | 0.006 | 0.006 | −0.28 | Y |
| Comparative Example 5 | 1-A-WC3 | 0.09 | 0.78 | 1.8 | 0.01 | 0.006 | 0.013 | 0.096 | 0.0024 | 0.024 | 0.006 | 0.006 | −0.28 | Y |

TABLE 4-continued

| | Test code | Component composition of weld metal (mass %) | | | | | | | | | | | | |
|---|---|---|---|---|---|---|---|---|---|---|---|---|---|---|
| | | C | Si | Mn | P | S | Al | Ti | B | Cr | Ni | Mo | Cx | Ti, B |
| Comparative Example 6 | 2-A-WC3 | 0.06 | 0.82 | 1.8 | 0.01 | 0.006 | 0.013 | 0.088 | 0.0024 | 0.024 | 0.006 | 0.006 | −0.33 | Y |
| Comparative Example 7 | 3-A-WC3 | 0.07 | 0.62 | 1.4 | 0.01 | 0.006 | 0.121 | 0.1 | 0.0032 | 0.024 | 0.006 | 0.006 | −0.34 | Y |

Y: The conditions that Ti content is 0.05% to 1.0% and B content is 0.0003% to 0.03% are satisfied.
N: The above conditions are not satisfied.

Additionally, samples for observing the cross section of the weld metal were collected from each of the lap fillet arc welded joints of Examples and Comparative Examples. Then the toe angle ρ of the weld metal, the Vickers hardness Hmax of the weld metal, the total number NA of the concave portions present on the surface of the weld metal included within a range of 0.4 mm or less from the fusion boundary, and the number NB of the concave portions in contact with the ferrite grains having a maximum grain size of 10 μm or more, were respectively measured. Furthermore, samples for fatigue test were collected from each of the lap fillet arc welded joints of Examples and Comparative Examples. Then a plane bending fatigue test was performed based on a plane bending fatigue test method (JIS Z 2275) of a metal flat plate. In the fatigue test, based on JIS Z 2273, the bending stress at which the fracture does not occur after $10^7$ repetitions was defined as the fatigue limit. In addition, since displacement was fixed in the plane bending fatigue test, the bending stress was calculated from the bending moment set at the initial stage and the section modulus of the cross section that was the minimum cross section of the test piece. Table 5 shows the cross-sectional observation results and fatigue test results of the weld metal. In Table 5, the fatigue test result of each example is shown by the ratio (fatigue limit ratio) to the fatigue limit of Comparative Example 1. Therefore, the fatigue limit ratio of Comparative Example 1 is "1".

TABLE 5

| | Test code | β (°) | Hmax | NA | NB | NB/NA | Fatigue limit ratio |
|---|---|---|---|---|---|---|---|
| Example 1 | 1-A-WC1 | 19.6 | 243 | 23 | 16 | 0.7 | 1.31 |
| Comparative Example 1 | 1-B-WC1 | 16.9 | 226 | 24 | 20 | 0.83 | 1 |
| Example 2 | 2-A-WC1 | 17 | 223 | 25 | 14 | 0.56 | 1.35 |
| Comparative Example 2 | 2-B-WC1 | 18.3 | 207 | 27 | 23 | 0.85 | 0.85 |
| Example 3 | 3-A-WC1 | 20.1 | 223 | 26 | 15 | 0.58 | 1.3 |
| Comparative Example 3 | 3-B-WC1 | 19.8 | 206 | 30 | 23 | 0.77 | 0.94 |
| Comparative Example 4 | 1-A-WC2 | 34.8 | 243 | 23 | 16 | 0.7 | 0.85 |
| Comparative Example 5 | 1-A-WC3 | 20.6 | 231 | 23 | 20 | 0.87 | 0.98 |
| Comparative Example 6 | 2-A-WC3 | 19.4 | 215 | 25 | 23 | 0.92 | 0.85 |
| Comparative Example 7 | 3-A-WC3 | 23.4 | 219 | 26 | 21 | 0.81 | 0.9 |

As shown in Table 3 and Table 4, Examples 1 to 3 satisfied all of the following manufacturing conditions for obtaining the lap fillet arc welded joint of the present invention.
(a) The component composition of the weld metal is controlled so that the Vickers hardness of the weld metal is 400 HV or less.
(b) The value of Cx becomes −0.4 or more, and the component composition of the weld metal is controlled so that the Ti content is included within the range of 0.05% to 1.0% and the B content is included within the range of 0.0003% to 0.03%.
(c) The wire protrusion length L1 is included within the range of 5 mm to 20 mm, and the distance L2 between the contact chip and the base material is included within the range of 8 mm to 30 mm.
(d) The welding speed is included within the range of 60 to 150 cm/min, and the welding current is included within the range of 150 to 250 A.

Accordingly, as shown in Table 5, in Examples 1 to 3, all the features of the lap fillet arc welded joint of the present invention as described below were obtained.
(A) The Vickers hardness of the weld metal is 400 HV or less.
(B) The toe angle β of the weld metal is included within the range of more than 0° and less than 30°.
(C) The value of NB/NA is 0.70 or less.

As shown in Table 5, in Examples 1 to 3, it was confirmed that the fatigue strength (fatigue limit) was improved by 30% or more as compared with Comparative Example 1. In other words, according to the lap fillet arc welded joint of the present invention having the above features (A), (B) and (C), even when a steel sheet having a tensile strength of 950 MPa or more was used as a base material, it had been demonstrated that fatigue strength could be improved.

In Comparative Examples 1 to 3, since the manufacturing condition (b) was not satisfied, many coarse ferrite grains were generated on the surface of the weld metal. As a result, it was considered that the value of NB/NA had exceeded 0.70. Therefore, it was considered that the fatigue strengths of Comparative Examples 1 to 3 were lower than those of Examples 1 to 3. In other words, according to the lap fillet arc welded joint not having the above feature (C), it had been demonstrated that the improvement effect of the fatigue strength could not be sufficiently obtained.

In Comparative Example 4, since the manufacturing condition (d) was not satisfied, it was considered that the toe angle β of the weld metal was 30° or more. Therefore, the shape of the toe portion of the weld metal became steep and stress was concentrated on the toe portion. As a result, it was considered that the fatigue strength of Comparative Example 4 was lower than those of Examples 1 to 3. Additionally, the fatigue strength of Comparative Example 4 was low even when compared with Comparative Example 1 where the toe shape was gentle (the toe angle β was less than 30°). In other words, according to the lap fillet arc welded joint not having the above feature (B), it had been demonstrated that the improvement effect of the fatigue strength could not be sufficiently obtained.

In Comparative Examples 5 to 7, since the manufacturing condition (c) was not satisfied, a lot of oxygen was mixed in the shield gas, thereby many coarse ferrite grains were formed on the surface of the weld metal. As a result, it was considered that the value of NB/NA had exceeded 0.70. Therefore, it was considered that the fatigue strengths of Comparative Examples 5 to 7 were lower than those of Examples 1 to 3. In other words, in order to obtain the above feature (C), it had been demonstrated that it was necessary not only to control the component composition of the weld metal but also to appropriately control the amount of oxygen mixed into the shield gas.

In addition, as shown in Table 5, when the wire protrusion length L1 and the distance L2 between the contact chip and the base material changed, the arc phenomenon changed. As a result, the shape of the toe portion of the weld metal (toe angle β) also changed. Additionally, since the amount of the generated ferrite grains also changed, the Vickers hardness of the weld metal also changed. However, these variations were not so great as the above features (A) and (B) could not be obtained.

Figure 11:
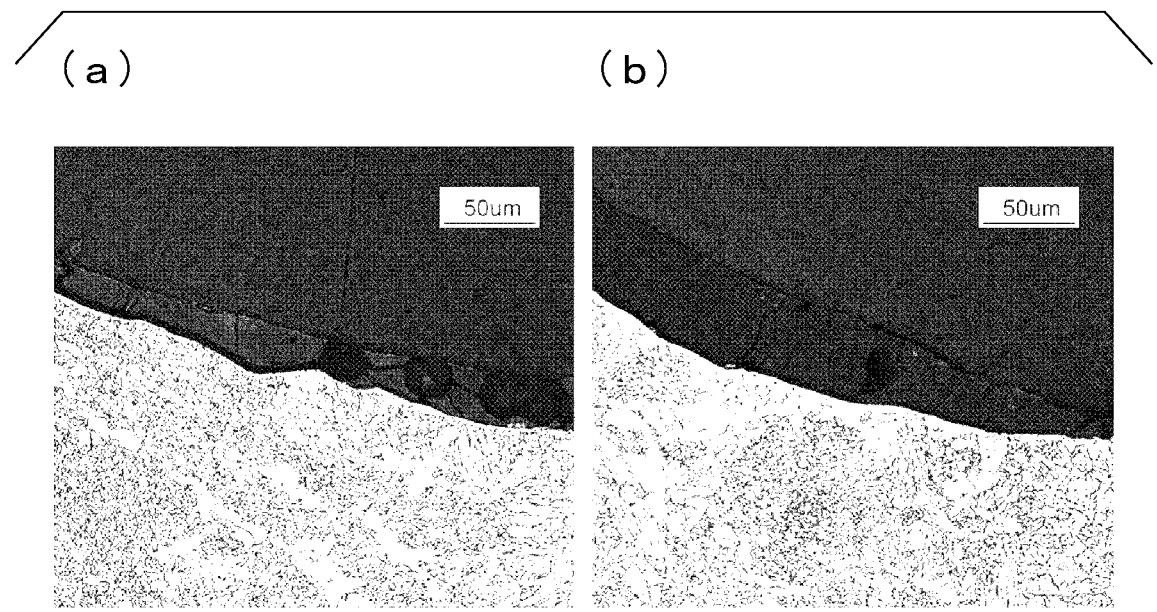
FIG. 11 is a cross-sectional photograph of a weld metal in an Example.

FIG. 11(a) shows a cross-sectional photograph of the vicinity of the toe portion of the weld metal in Example 1. FIG. 11(b) shows a cross-sectional photograph of the vicinity of the toe portion of the weld metal in Comparative Example 1. In Example 1, it was appeared that the ferrite in the vicinity of the fusion boundary was refined.

INDUSTRIAL APPLICABILITY

According to the present invention, strain concentration does not occur in the ferrite that becomes the starting point of the fatigue crack and is present on the surface of the weld metal. Therefore, the fatigue limit of the welded joint becomes good, and the fatigue life can be extended. Additionally, there is no concern about hydrogen embrittlement of the joint. As a result, by applying the present invention to automotive underbody members and building materials, safety and durability can be improved, and the great industrial contribution can be obtained.

The invention claimed is:

1. A lap fillet arc welded joint comprising:
   a first steel sheet and a second steel sheet which are overlapped each other, the first steel sheet and the second steel sheet each having a tensile strength of 950 MPa or more; and
   a weld metal which extends along a corner formed by an upper surface of the first steel sheet and an end surface of the second steel sheet,
   wherein a Vickers hardness of the weld metal is 400 HV or less, and
   in a case where a cross section orthogonal to a weld line of the weld metal is viewed, when:
      a position of a fusion boundary present on the upper surface of the first steel sheet is defined as a point A;
      a position 0.5 mm away from the point A toward the weld metal in a X direction parallel to the upper surface of the first steel sheet is defined as a point L);
      a position 0.4 mm away from the point A toward the weld metal in the X direction is defined as a point C;
      an intersection point between a surface of the weld metal and a straight line which passes through the point D and extends in a thickness direction of the first steel sheet is defined as a point B;
      an angle between a straight line connecting the point A with the point B and a straight line connecting the point A with the point D is defined as a toe angle β of the weld metal;
      the total number of concave portions present on the surface of the weld metal included within a range between the point A and the point C is defined as NA; and
      the number of concave portions in contact with ferrite grains having a maximum grain size of 10 μm or more is defined as NB,
   the weld metal satisfies the following conditional expressions (1) and (2) at the same time;

$0° < β < 30°$ (1); and $NB/NA ≤ 0.70$ (2), where NA is 20 or more.

2. The lap fillet arc welded joint according to claim 1, wherein each of the first steel sheet and the second steel sheet has a thickness of 0.8 mm to 3.5 mm.

* * * * *